(12) United States Patent
Bai et al.

(10) Patent No.: US 11,836,693 B2
(45) Date of Patent: Dec. 5, 2023

(54) SUBSCRIPTION PROCESSING METHOD, DEVICE, ELECTRONIC DEVICE AND READABLE STORAGE MEDIUM

(71) Applicant: JOYME PTE. LTD., Singapore (SG)

(72) Inventors: Xiliang Bai, Cayman Islands (GB); Bo Xu, Cayman Islands (GB); Meng Xue, Cayman Islands (GB); Junda Lu, Caymans Islands (GB)

(73) Assignee: JOYME PTE. LTD., Singapore (SG)

( * ) Notice: Subject to any disclaimer, the term of this patent is extended or adjusted under 35 U.S.C. 154(b) by 319 days.

(21) Appl. No.: 16/645,698

(22) PCT Filed: Aug. 2, 2018

(86) PCT No.: PCT/CN2018/098278
§ 371 (c)(1),
(2) Date: Mar. 9, 2020

(87) PCT Pub. No.: WO2019/047635
PCT Pub. Date: Mar. 14, 2019

(65) Prior Publication Data
US 2020/0279236 A1    Sep. 3, 2020

(30) Foreign Application Priority Data

Sep. 11, 2017 (CN) .......................... 201710812109.9

(51) Int. Cl.
*G06Q 20/02* (2012.01)
*G06F 16/9535* (2019.01)
(Continued)

(52) U.S. Cl.
CPC ....... *G06Q 20/127* (2013.01); *G06F 16/9535* (2019.01); *G06Q 10/10* (2013.01);
(Continued)

(58) Field of Classification Search
None
See application file for complete search history.

(56) References Cited

U.S. PATENT DOCUMENTS 9,887,842 B2 * 2/2018 Chow ................ H04L 67/06
2008/0250035 A1 * 10/2008 Smith ................ H04M 3/4878
(Continued)

FOREIGN PATENT DOCUMENTS

| CN | 101267590 A | 9/2008 |
|---|---|---|
| CN | 101765112 A | 6/2010 |

(Continued)

OTHER PUBLICATIONS

International Search Report for International Application No. PCT/CN2018/098278 dated Oct. 22, 2018.

*Primary Examiner* — Neha Patel
*Assistant Examiner* — Nicholas K Phan
(74) *Attorney, Agent, or Firm* — Suiter Swantz pc llo (57) ABSTRACT

Embodiments of the disclosure provide a subscription processing method, apparatus, an electronic device and a readable storage medium. The method is applied to a client and comprises: when receiving a subscription request for a target service in the client, determining whether an application store account bound to the client has subscribed to the target service; if the application store account bound to the client has subscribed to the target service, determining whether the target service has been unsubscribed; if the target service has been unsubscribed, determining whether the target service is still in a subscription period; and if the target service is still in the subscription period, intercepting the subscription request. By applying the embodiments of the present application, the client platform may be prevented from suffering losses.

6 Claims, 3 Drawing Sheets

(51) Int. Cl.
    *G06Q 10/10*           (2023.01)
    *G06Q 20/08*           (2012.01)
    *G06Q 30/06*           (2023.01)
    *H04L 67/01*           (2022.01)
    *G06Q 20/12*           (2012.01)

(52) U.S. Cl.
    CPC ........... *G06Q 20/085* (2013.01); *G06Q 30/06* (2013.01); *G06Q 2220/10* (2013.01); *G06Q 2220/18* (2013.01); *H04L 67/01* (2022.05)

(56) References Cited

U.S. PATENT DOCUMENTS

2010/0004004 A1*   1/2010   Browne-Swinburne ..................... H04W 4/02 455/457
2017/0094332 A1*   3/2017   Thomas ........... H04N 21/25883
2017/0331825 A1*  11/2017   Banka .................... G06F 21/105
2018/0316656 A1*  11/2018   Giglio ...................... H04L 67/34
2019/0182537 A1*   6/2019   Deshpande ............ H04H 60/72
2019/0273790 A1*   9/2019   Zhao .................. H04L 67/2838

FOREIGN PATENT DOCUMENTS

| | | |
|---|---|---|
| CN | 101877086 A | 11/2010 |
| CN | 102509043 A | 6/2012 |
| CN | 107592633 A | 1/2018 |
| WO | 2015/080639 A1 | 6/2015 |

\* cited by examiner

SUBSCRIPTION PROCESSING METHOD, DEVICE, ELECTRONIC DEVICE AND READABLE STORAGE MEDIUM

The present application claims the priority to a Chinese Patent Application No. 201710812109.9, filed with the China National Intellectual Property Administration on Sep. 11, 2017 and entitled "Subscription Processing Method, Device, Electronic Device And Readable Storage Medium", which is incorporated herein by reference in its entirety.

TECHNICAL FIELD

The present application relates to a technical field of communication, and in particular, to a subscription processing method, apparatus, an electronic device and a readable storage medium.

BACKGROUND

At present, after logging in an application store with an application store account, a user may download an application APP installation package from the application store to a user terminal, and then install an APP client on the user terminal with the APP installation package. At this time, the APP client has been bound to the application store account. In this way, when the user successfully logs in the APP with a platform account of the APP (i.e., the APP client), the APP may communicate with a server of the APP. If the user wants to subscribe to certain functions of the APP, such as paid news, the APP server may send a fee deduction request for the application store account to a server of the application store, for deducting fees from the application store account, and thereby successfully subscribing to the functions. In addition, the user may also select to renew or unsubscribe to a function of the APP. After the unsubscription, if the function is still in the subscription period, the function can still be used normally, and if the function is not in the subscription period, the function cannot be repeatedly subscribed.

For example, after a user 1 logs in an application store with an application store account 1, the user 1 downloads an installation package from the application store and installs an APP1 on a user terminal 1. Then, the user 1 logs in the APP1 with a platform account A of the APP1, and subscribes to paid news in the APP1 for one month. In order to avoid automatic subscription next month, the user 1 selects to unsubscribe to the paid news.

In an example, a user 2 may also log in the application store with the application store account 1, download the installation package from the application store, install the APP1 on a user terminal 2, and then log in to the APP1 with an APP1 platform account B. In this case, when the user 2 subscribe to the paid news with the platform account B of the APP1, since the application store server will detect that the application store account 1 bound to the APP1 has subscribed to the paid news and the paid news is still in the subscription period, no fee will be deducted for this subscription. In this way, the platform account B of the APP1 may become a subscriber of the paid news for free during the subscription period of the paid news. In other words, an unlimited number of platform accounts of the APP1 platform may become subscribers of the paid news of the APP1 for free during the subscription period of the paid news, resulting in a loss of the APP1 platform.

SUMMARY

The embodiments of the present application is to provide a subscription processing method, apparatus, an electronic device and a readable storage medium, so as to avoid the loss of a client platform.

In a first aspect, an embodiment of the present application provides a subscription processing method, which is applied in a client. The method may include:

in responding to receiving a subscription request for a target service in the client, determining whether an application store account bound to the client has subscribed to the target service;

if the application store account bound to the client has subscribed to the target service, determining whether the target service has been unsubscribed;

if the target service has been unsubscribed, determining whether the target service is still in a subscription period; and if the target service is still in the subscription period, intercepting the subscription request.

Optionally, if the application store account bound to the client has not subscribed to the target service, the method may further include:

sending the subscription request to an application store server corresponding to the application store account, such that the application store server deducts fee from the application store account after receives the subscription request, and sends subscription content corresponding to the target service to the client; and receiving the subscription content, sent by the application store server, corresponding to the target service.

Optionally, if the target service has not been unsubscribed, the method may further include:

displaying prompt information related to renewing after the subscription expires.

Optionally, if the target service is not in the subscription period, the method may further include:

triggering the step of sending the subscription request to an application store server corresponding to the application store account.

Optionally, determining whether the application store account bound to the client has subscribed to the target service may include:

sending a first query request for the target service to the application store server corresponding to the application store account bound to the client, such that the application store server queries whether the application store account has subscribed to the target service after receiving the first query request, and sends a first query result of querying whether the application store account has subscribed to the target service to the client;

receiving the first query result sent by the application store server; and determining whether the application store account has subscribed to the target service based on the first query result.

Optionally, determining whether the application store account bound to the client has subscribed to the target service may include:

sending a second query request for the target service to the application store server corresponding to the application store account bound to the client, such that the application store server queries complete subscription information of the application store account for the target service, and sends the complete subscription information to the client; wherein, the complete subscription information comprises subscription information, unsubscription information, renewal information, and subscription period information;

receiving the complete subscription information sent by the application store server; and determining whether the application store account has subscribed to the target service based on the subscription information in the complete subscription information.

In a second aspect, an embodiment of the present application provides a subscription processing apparatus, which is applied in a client. The apparatus may include:

a first determination unit, configured for, in responding to receiving a subscription request for a target service in the client, determining whether an application store account bound to the client has subscribed to the target service;

a second determination unit, configured for, if the first determination unit determines that the application store account bound to the client has subscribed to the target service, determining whether the target service has been unsubscribed;

a third determination unit, configured for, if the second determination unit determines that the target service has been unsubscribed, determining whether the target service is still in a subscription period; and an interception unit, configured for, if the third determination unit determines that the target service is still in the subscription period, intercepting the subscription request.

Optionally, in the embodiment of the present application, the apparatus may further include:

a subscription request sending unit, configured for, if the first determination unit determines that the application store account bound to the client has not subscribed to the target service, sending the subscription request to an application store server corresponding to the application store account, such that the application store server deducts fee from the application store account after receives the subscription request, and sends subscription content corresponding to the target service to the client; and a subscription content receiving unit, configured for receiving the subscription content, sent by the application store server, corresponding to the target service.

Optionally, in the embodiment of the present application, the apparatus may further include:

a display unit, configured for, if the second determination unit determines that the target service has not been unsubscribed, displaying prompt information related to renewing after the subscription expires.

Optionally, in the embodiment of the present application, the apparatus may further include:

a triggering unit, configured for, if the third determination unit determines that the target service is not in the subscription period, triggering the subscription request sending unit.

Optionally, in the embodiment of the present application, the first determination unit may include:

a first query request sending subunit, configured for, when receiving the subscription request for the target service in the client, sending a first query request for the target service to the application store server corresponding to the application store account bound to the client, such that the application store server queries whether the application store account has subscribed to the target service after receiving the first query request, and sends a first query result of querying whether the application store account has subscribed to the target service to the client;

a first query result receiving subunit, configured for receiving the first query result sent by the application store server; and a determination subunit, configured for determining whether the application store account has subscribed to the target service based on the first query result.

Optionally, in the embodiment of the present application, the first determination unit may include:

a second query request sending subunit, configured for, when receiving the subscription request for the target service in the client, sending a second query request for the target service to the application store server corresponding to the application store account bound to the client, such that the application store server queries complete subscription information of the application store account for the target service, and sends the complete subscription information to the client; wherein, the complete subscription information comprises subscription information, unsubscription information, renewal information, and subscription period information;

a complete subscription information receiving subunit, configured for receiving the complete subscription information sent by the application store server; and a second determination subunit, configured for, determining whether the application store account has subscribed to the target service based on the subscription information in the complete subscription information.

In a third aspect, the embodiment of the present application provides an electronic device with a client installed therein and including a processor, a communication interface, a memory and a communication bus; wherein, the processor, the communication interface and the memory communicate with each other via the communication bus;

the memory is configured for storing a computer program;

the processor is configured for executing the computer program stored on the memory to implement the above any one subscription processing method.

In a fourth aspect, an embodiment of the present application provides a readable storage medium. The readable storage medium stores a computer program therein. The computer program, when being executed by a processor, implements the steps of the above any one subscription processing method.

In a fifth aspect, an embodiment of the present application also provides a computer program product including instructions. The computer program product, when being executing on a computer, causes the computer to perform the steps of the above any one subscription processing method.

In the embodiment of the present application, when a client receives the subscription request for the target service, the client determines whether the application store account bound to the client has subscribed to the target service. If the client determines that the application store account bound to the client has subscribed to the target service, the client continues to determine whether an unsubscription operation is performed after subscribing to the target service. If the unsubscription operation is performed after subscribing to the target service, the client continues to determine whether the target service is in the subscription period. If the target service is in the subscription period, the client intercepts the subscription request. In this way, it is possible to avoid the problem that multiple users logs in the application store according to the same application store account, download the installation package from the application store to multiple user terminals, and then install clients in the multiple user terminals, and after subscribing and unsubscribing the target service on any one of the clients with a client account, the multiple client accounts may subscribe to the target service for free, avoiding the loss of the client platform.

BRIEF DESCRIPTION OF THE DRAWINGS

To describe the technical solutions of embodiments of the present application or of the prior art more clearly, the accompanying drawings to be used in the description of embodiments or the prior art will be described briefly below. Obviously, the accompanying drawings described below are merely drawings of some embodiments of the present application. Those skilled in the art can obtain other drawings based on these accompanying drawings without creative efforts.

DETAILED DESCRIPTION

The technical solutions in the embodiments of the present application will be described clearly and completely below in combination with the accompanying drawings in the embodiments of the present application. Obviously, the described embodiments are merely a part of and not all of the embodiments of the present application. All other embodiments obtained by those skilled in the art based on the embodiments of the present application without creative efforts shall fall within the scope of protection of the present application.

In order to solve the problem of the loss of the client platform in the prior art, embodiments of the present application provide a subscription processing method, apparatus, an electronic device and a readable storage medium.

The subscription processing method according to an embodiment of the present application will be firstly described below.

Figure 1:
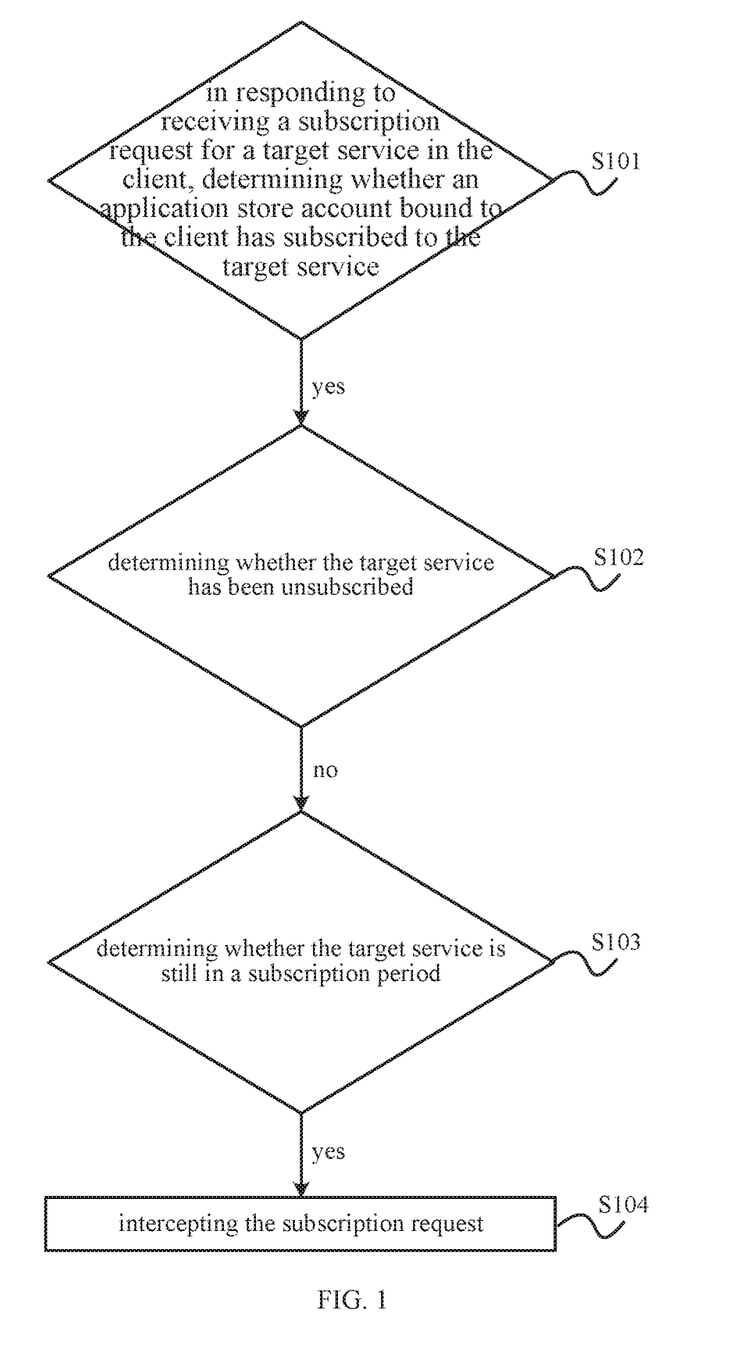
FIG. 1 is a flowchart of a subscription processing method according to an embodiment of the present application.

It should be noted that the subscription processing method provided in the embodiment of the present application is performed by a client installed on a user terminal. The user terminal includes, but is not limited to, a mobile phone and a tablet computer. Referring to FIG. 1, the subscription processing method according to the embodiment of the present application may include the following steps.

In S101, in responding to receiving a subscription request for a target service in the client, it is determined whether an application store account bound to the client has subscribed to the target service; if it is determined that the application store account bound to the client has subscribed to the target service, step S102 is performed.

It can be understood that, after the user successfully logs in the client with a client account, the client may receive a subscription request for a target service from the user. In addition, after receiving the subscription request, the client may determine whether the application store account bound to the client has subscribed to the target service. If the client determines that the application store account bound to the client has subscribed to the target service, it indicates that the client account is likely to perform an operation for becoming a subscriber of the target service for free; and at this time, the client may perform the step S102 for further determination.

For example, it is assumed that a user logs in an application store with an application store account A, and downloads the same application installation package from the application store to a first user terminal and a second user terminal. Therefore, a client 1 is obtained by installing the application installation package on the first user terminal, and the client 2 is obtained by installing the application installation package on the second user terminal. At this time, the client 1 and the client 2 are determined, by the application store server corresponding to the application store account A, as the same client. In this way, after any one account of the client 1 successfully subscribes to the paid news for one month via the client 1 at 13:00 today, and when any one account of the client 2 again subscribes to the paid news for one month via the client 2 at 14:00 today, the client 2 will determine that the application store account A bound to the client 2 has subscribed to the service of the paid news for one month. At this time, in order to avoid that the client account logging in the client 2 is performing the operation for becoming a subscriber of the target service for free, the step S102 may be performed for further determination. Wherein, the account of the client 1 and the account of client 2 may be the same or different, which are reasonable.

In addition, if it is determined that the application store account bound to the client has not subscribed to the target service, it indicates that the client account is not performing the operation for becoming the subscriber of the target service for free. At this time, a subscription request may be sent to the application store server corresponding to the application store account. In this way, after receiving the subscription request, the application store server performs the fee deduction for the application store account, and sends the subscription content corresponding to the target service to the client, thereby achieving the successful subscription of the client account for the target service.

It should be noted that, determining whether an application store account bound to the client has subscribed to the target service may specifically include determining whether the application store account has subscribed to the target service in history; or, determining whether the application store account has subscribed to the target service within a preset time interval (for example, one year) from receiving the subscription request, which are reasonable.

In S102, determining whether the target service has been unsubscribed; and if it is determined that the target service has been unsubscribed, the step S103 is performed.

It can be understood that, the same client cannot repeatedly subscribe to the same service without unsubscribing the service. However, after the subscription, the same client may subscribe the service again. If the time at which the service is subscribed again is still in a subscription period, no fee deduction will be performed for this subscription. Therefore, after determining that the target service has been subscribed, the client may further determine whether the target service, after being subscribed, has been unsubscribed. If the target service, after being subscribed, has not been unsubscribed, the client may respond to this subscription request by displaying prompt information related to renewing after the subscription expires.

If the target service, after being subscribed, has been unsubscribed, it indicates that the client account currently logging in the client is likely to perform an operation for becoming the subscriber of the target service for free. At this time, the step S103 is performed for further determination.

In S103, determining whether the target service is still in a subscription period; if it is determined that the target service is still in the subscription period, the step S104 is performed.

In S104, intercepting the subscription request.

It can be understood that, after the target service has been unsubscribed and when the target service is not in the subscription period, the client account cannot become the subscriber of the target service for free. When the target service has been unsubscribed and the target service is still in the subscription period, in this case, after the client account successfully subscribes to the target service, the client account may successfully subscribe to the target service without payment. Therefore, after determining that the target service has been unsubscribed, it is necessary to further determine whether the target service is in the subscription period. If the target service is still in the subscription period, the subscription request for the target service is intercepted, so as to avoid that the client account becomes a subscriber of the target service without payment, and thus the loss of the client platform may be avoided.

If it is determined that the target service is not in the subscription period, the subscription request may be normally sent to the application store server corresponding to the application store account.

It should be noted that the operation of intercepting the subscription request may specifically include discarding the subscription request, which is not limited to this, of course. In addition, as long as an operation can cause the subscription request not to be sent to the application store server, the operation may be used as an interception manner implemented in the present application.

In the embodiment of the present application, when a client receives the subscription request for the target service, the client determines whether the application store account bound to the client has subscribed to the target service. If the client determines that the application store account bound to the client has subscribed to the target service, the client continues to determine whether an unsubscription operation is performed after subscribing to the target service. If the unsubscription operation is performed after subscribing to the target service, the client continues to determine whether the target service is in the subscription period. If the target service is in the subscription period, the client intercepts the subscription request. In this way, it is possible to avoid the problem that multiple users logs in the application store according to the same application store account, download the installation package from the application store to multiple user terminals, and then install clients in the multiple user terminals, and after subscribing and unsubscribing the target service on any one of the clients with a client account, the multiple client accounts may subscribe to the target service for free, avoiding the loss of the client platform.

A specific implementation manner of a client determining whether an application store account bound to the client has subscribed to the target service will be describes below.

In an implementation, when a client receives a subscription request for a target service in the client, the client may send a first query request for the target service to an application store server corresponding to the application store account bound to the client. In this way, after receiving the first query request, the application store server queries whether the application store account has subscribed to the target service, and sends a first query result of querying whether the application store account has subscribed to the target service to the client. In this way, after receiving the first query result sent by the application store server, the client may determine whether the application store account has subscribed to the target service based on the first query result.

In another implementation, when a client receives a subscription request for a target service in the client, the client may send a second query request for the target service to an application store server corresponding to the application store account bound to the client. In this way, after receiving the second query request, the application store server queries complete subscription information, corresponding to the application store account, of the target service, and sends the complete subscription information to the client. The complete subscription information includes subscription information, unsubscription information, renewal information, and subscription period information. In this way, after receiving the complete subscription information sent by the application store server, the client may, based on the subscription information in the complete subscription information, determine whether the application store account has subscribed to the target service. In addition, based on the unsubscription (or renewal) information in the complete subscription information, the client may also determine whether the application store account has unsubscribed (or renewed) the target service. In addition, based on the subscription period information in the complete subscription information, the client may also determine whether the target service subscribed by the application store account has exceeded the subscription period.

For clarity, the subscription processing method according to an embodiment of the present application will be described below with reference to specific examples.

Figure 2:
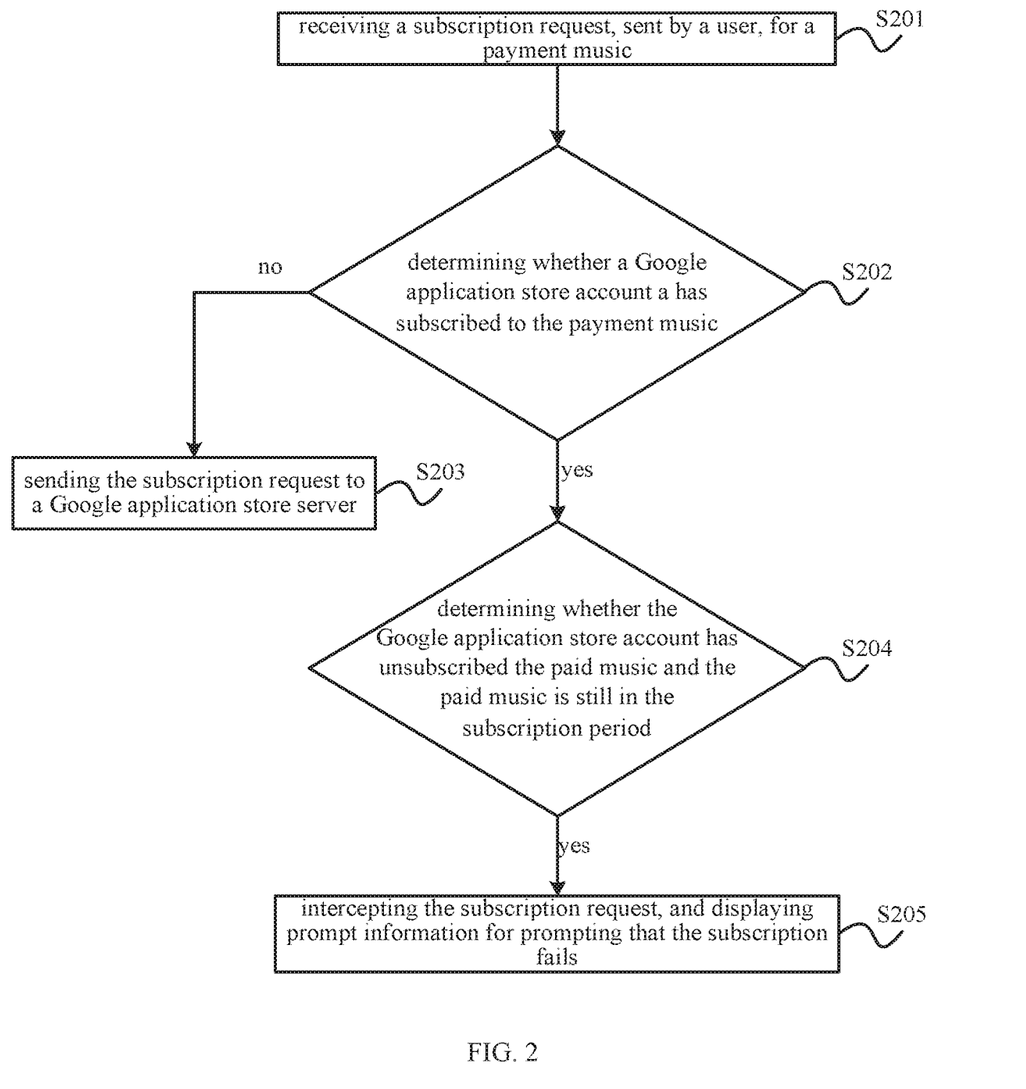
FIG. 2 is another flowchart of a subscription processing method according to an embodiment of the present application.

It is assumed that a user terminal 1 successfully logs in a Google application store with a Google application store account a. In addition, the user terminal 1 downloads an application installation package from the Google application store, and installs the application installation package to obtain a client A. Then, when the user operates the user terminal 1 to send a subscription request for a paid music to the client A, the client A may perform the steps shown in FIG. 2:

in S201, receiving a subscription request, sent by a user, for a paid music;

in S202, determining whether a Google application store account a has subscribed to the paid music; if the Google application store account a has not subscribed to the paid music, performing the step S203; if the Google application store account a has subscribed to the paid music, performing the step S204;

in S203, sending the subscription request to a Google application store server, so that the Google application store server records a subscription status of the Google application store account a for the paid music, and sending subscription content corresponding to the paid music to the client A;

in S204, determining whether the Google application store account has unsubscribed the paid music and the paid music is still in the subscription period; if the Google application store account has unsubscribed the paid music and the paid music is still in the subscription period, performing the step S205;

in S205, intercepting the subscription request, and displaying prompt information for prompting that the subscription fails.

In summary, by applying the embodiment of the present application, the client platform may be prevented from suffering losses.

Figure 3:
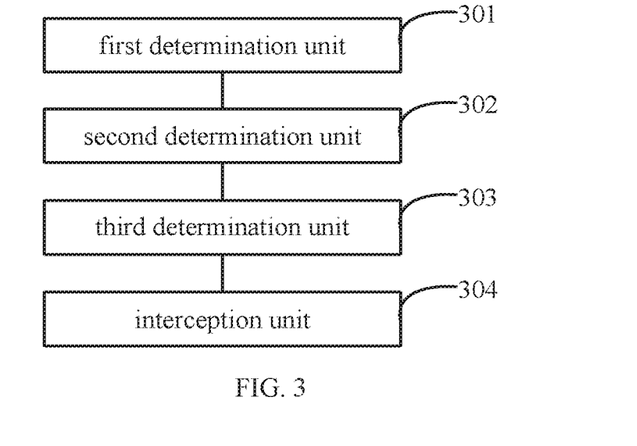
FIG. 3 is a schematic structural diagram of a subscription processing apparatus according to the present application.

Corresponding to the above embodiment of the method, an embodiment of the present application further provides a subscription processing apparatus, which is applied in a client. Referring to FIG. 3, the apparatus may include:

- a first determination unit 301, configured for, in responding to receiving a subscription request for a target service in the client, determining whether an application store account bound to the client has subscribed to the target service;
- a second determination unit 302, configured for, if the first determination unit 301 determines that the application store account bound to the client has subscribed to the target service, determining whether the target service has been unsubscribed;
- a third determination unit 303, configured for, if the second determination unit 302 determines that the target service has been unsubscribed, determining whether the target service is still in a subscription period; and
- an interception unit 304, configured for, if the third determination unit 303 determines that the target service is still in the subscription period, intercepting the subscription request.

In the embodiment of the present application, when a client receives the subscription request for the target service, the client determines whether the application store account bound to the client has subscribed to the target service. If the client determines that the application store account bound to the client has subscribed to the target service, the client continues to determine whether an unsubscription operation is performed after subscribing to the target service. If the unsubscription operation is performed after subscribing to the target service, the client continues to determine whether the target service is in the subscription period. If the target service is in the subscription period, the client intercepts the subscription request. In this way, it is possible to avoid the problem that multiple users logs in the application store according to the same application store account, download the installation package from the application store to multiple user terminals, and then install clients in the multiple user terminals, and after subscribing and unsubscribing the target service on any one of the clients with a client account, the multiple client accounts may subscribe to the target service for free, avoiding the loss of the client platform.

Optionally, in the embodiment of the present application, the apparatus may further include:

- a subscription request sending unit, configured for, if the first determination unit 301 determines that the application store account bound to the client has not subscribed to the target service, sending the subscription request to an application store server corresponding to the application store account, such that the application store server performs fee deduction for the application store account after receiving the subscription request, and sends subscription content corresponding to the target service to the client; and
- a subscription content receiving unit, configured for receiving the subscription content, sent by the application store server, corresponding to the target service.

Optionally, in the embodiment of the present application, the apparatus may further include:

- a display unit, configured for, if the second determination unit 302 determines that the target service has not been unsubscribed, displaying prompt information related to renewing after the subscription expires.

Optionally, in the embodiment of the present application, the apparatus may further include:

- a triggering unit, configured for, if the third determination unit 303 determines that the target service is not in the subscription period, triggering the subscription request sending unit.

Optionally, in an embodiment of the present application, the first determination unit 301 may include:

- a first query request sending subunit, configured for, when receiving the subscription request for the target service in the client, sending a first query request for the target service to an application store server corresponding to the application store account bound to the client, such that the application store server queries whether the application store account has subscribed to the target service after receiving the first query request, and sends a first query result of querying whether the application store account has subscribed to the target service to the client;
- a first query result receiving subunit, configured for receiving the first query result sent by the application store server; and
- a determination subunit, configured for determining whether the application store account has subscribed to the target service based on the first query result.

Optionally, in another embodiment of the present application, the first determination unit 301 may include:

- a second query request sending subunit, configured for, when receiving the subscription request for the target service in the client, sending a second query request for the target service to an application store server corresponding to the application store account bound to the client, such that the application store server queries complete subscription information after the application store server receives the second query request of the application store account for the target service, and sends the complete subscription information to the client; wherein, the complete subscription information includes subscription information, unsubscription information, renewal information, and subscription period information;
- a complete subscription information receiving subunit, configured for receiving the complete subscription information sent by the application store server; and
- a second determination subunit, configured for determining whether the application store account has subscribed to the target service based on the subscription information in the complete subscription information.

In summary, by applying the embodiment of the present application, the client platform may be prevented from suffering losses.

Figure 4:
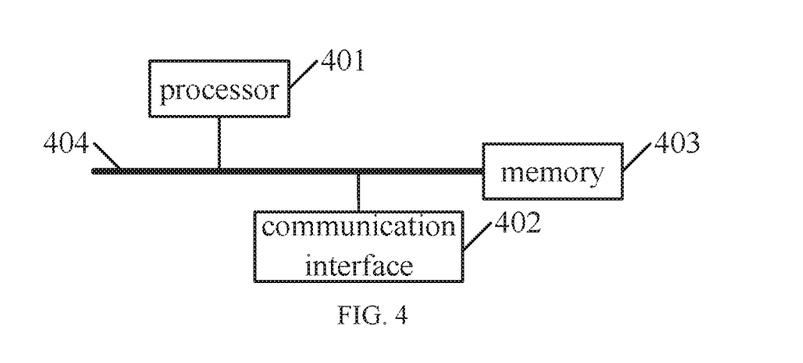
FIG. 4 is a schematic structural diagram of an electronic device according to an embodiment of the present application.

Corresponding to the above embodiment of the method, an embodiment of the present application further provides an electronic device, having a client installed therein. Referring to FIG. 4, the electronic device includes a processor 401, a communication interface 402, a memory 403 and a communication bus 404; wherein, the processor 401, the communication interface 402 and the memory 403 communicate with each other via the communication bus 404;

the memory 403 is configured for storing a computer program;

the processor 401 is configured for executing the computer program stored on the memory 403 to implement the steps of the above any one subscription processing method.

The above-mentioned communication bus may be a peripheral component interconnect (PCI) bus or an extended industry standard architecture (EISA) bus and the like. This communication bus may include an address bus, a data bus, a control bus, or the like. For ease of representation, only one thick line is shown in the figure, which does not represent that there is only one communication bus or one type of communication bus.

The communication interface is configured for communication between the above electronic device and other devices.

The memory may include a random access memory (RAM), or may include a non-volatile memory (NVM), for example at least one disk memory. Optionally, the memory may further be at least one storage apparatus located away from the above processor.

The above processor may be a general-purpose processor, such as a central processing unit (CPU), a network processor (NP), or the like; the above processor may also be a digital signal processor (DSP), an application specific integrated circuit (ASIC), a field-programmable gate array (FPGA) or other programmable logic device, a discrete gate or transistor logic device, a discrete hardware component.

Corresponding to the above embodiment of the method, an embodiment of the present application provides a readable storage medium. The readable storage medium stores a computer program therein. The computer program, when being executed by a processor, implements the steps of the above any one subscription processing method.

Corresponding to the above embodiment of the method, an embodiment of the present application also provides a computer program product including instructions. The computer program product, when being executing on a computer, causes the computer to perform the steps of the above any one subscription processing method.

In summary, by applying the embodiment of the present application, the client platform may be prevented from suffering losses.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the electronic device, the readable storage medium and the computer program product are described briefly, since they are substantially similar to the embodiment of the method, and the related contents can refer to the description of the embodiment of the method.

The above described embodiments are simply preferable embodiments of the present application, and are not intended to limit the scope of protection of the present application. Any modifications, equivalent alternatives, improvements, or the like within the spirit and principle of the present application shall be included within the scope of protection of the present application.

The invention claimed is:

1. A subscription processing method, which is applied in a client, wherein the client is bound to an application store account, and the application store account is also bound to another client, wherein a user logs in an application store with the application store account, and downloads a same application installation package from the application store to a first user terminal and a second user terminal, the client is obtained by installing the application installation package on the first user terminal, and the another client is obtained by installing the application installation package on the second user terminal, wherein the method comprises:
   in responding to receiving a subscription request of a client account for a target service in the client after a user successfully logs in the client with the client account, determining whether the application store account bound to the client has subscribed to the target service;
   in responding to that the application store account bound to the client has subscribed to the target service, which indicates that the client account initiating the subscription request for the target service is likely to perform an operation for becoming a subscriber of the target service for free, determining whether the target service has been unsubscribed by the application store account;
   in responding to that the target service has been subscribed and then unsubscribed by the application store account, which indicates that the client account initiating the subscription request for the target service is likely to perform an operation for becoming a subscriber of the target service for free, determining whether the target service is still in a subscription period; and
   in responding to that the target service is still in the subscription period, which indicates that the client account initiating the subscription request for the target service is performing an operation for becoming a subscriber of the target service for free, intercepting the subscription request, wherein, when the target service has been subscribed and then unsubscribed by the application store account and the target service is still in the subscription period, after the client account successfully subscribes to the target service, the client account can successfully subscribe to the target service without payment.

2. The method of claim 1, wherein, in responding to that the application store account bound to the client has not subscribed to the target service, the method further comprises:
   sending the subscription request to an application store server corresponding to the application store account, such that the application store server deducts fee from the application store account after receiving the subscription request, and sends subscription content corresponding to the target service to the client; and
   receiving the subscription content, sent by the application store server, corresponding to the target service.

3. The method of claim 1, wherein, in responding to that the target service has not been unsubscribed, the method further comprises:
   displaying prompt information related to renewing after the subscription expires.

4. The method of claim 2, wherein, in responding to that the target service is not in the subscription period, the method further comprises:

triggering the step of sending the subscription request to an application store server corresponding to the application store account.

5. The method of claim 1, wherein, determining whether the application store account bound to the client has subscribed to the target service comprises:

sending a first query request for the target service to the application store server corresponding to the application store account bound to the client, such that the application store server queries whether the application store account has subscribed to the target service after receiving the first query request, and sends a first query result of querying whether the application store account has subscribed to the target service to the client;

receiving the first query result sent by the application store server; and determining whether the application store account has subscribed to the target service based on the first query result.

6. The method of claim 1, wherein, determining whether the application store account bound to the client has subscribed to the target service comprises:

sending a second query request for the target service to the application store server corresponding to the application store account bound to the client, such that the application store server queries complete subscription information of the application store account for the target service, and sends the complete subscription information to the client; wherein, the complete subscription information comprises subscription information, unsubscription information, renewal information, and subscription period information;

receiving the complete subscription information sent by the application store server; and determining whether the application store account has subscribed to the target service based on the subscription information in the complete subscription information.

* * * * *